United States Patent
Wolff et al.

(10) Patent No.: US 11,227,588 B2
(45) Date of Patent: Jan. 18, 2022

(54) SYSTEM AND METHOD FOR FEATURE BASED BEAM STEERING

(71) Applicant: Nuance Communications, Inc., Burlington, MA (US)

(72) Inventors: Tobias Wolff, Neu-Ulm Burlafingen (DE); Simon Graf, Ulm (DE)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 129 days.

(21) Appl. No.: 16/213,194

(22) Filed: Dec. 7, 2018

(65) Prior Publication Data

US 2020/0184954 A1 Jun. 11, 2020

(51) Int. Cl.
G10L 15/22 (2006.01)
G10L 15/02 (2006.01)
G10L 15/30 (2013.01)
G10L 25/21 (2013.01)

(52) U.S. Cl.
CPC .............. *G10L 15/22* (2013.01); *G10L 15/02* (2013.01); *G10L 15/30* (2013.01); *G10L 25/21* (2013.01)

(58) Field of Classification Search
CPC ................................ G10L 15/02; H04R 3/005
See application file for complete search history.

(56) References Cited

U.S. PATENT DOCUMENTS

| | | | |
|---|---|---|---|
| 9,734,822 B1* | 8/2017 | Sundaram | G10L 15/08 |
| 9,864,028 B2 | 1/2018 | Kanno et al. | |
| 10,284,695 B1* | 5/2019 | Gejji | G06F 1/1656 |
| 10,356,362 B1* | 7/2019 | Rudberg | H04R 3/005 |
| 2015/0006176 A1* | 1/2015 | Pogue | G10L 15/22 704/249 |
| 2018/0102136 A1* | 4/2018 | Ebenezer | G10L 15/02 |
| 2018/0374495 A1* | 12/2018 | Fienberg | H04R 1/406 |
| 2019/0096429 A1* | 3/2019 | Kovvali | G10L 25/84 |
| 2019/0098399 A1* | 3/2019 | Lashkari | H04R 3/005 |
| 2019/0313054 A1* | 10/2019 | Harrison | G06F 3/165 |

FOREIGN PATENT DOCUMENTS

| | | |
|---|---|---|
| GB | 2521175 A | 6/2015 |
| WO | 2017138934 A1 | 8/2017 |
| WO | 2017160294 A1 | 9/2017 |

OTHER PUBLICATIONS

International Search Report and Written Opinion of the International Searching Authority for International PCT Application No. PCT/US2019/065177 dated Feb. 24, 2020.

* cited by examiner

*Primary Examiner* — Shaun Roberts
(74) *Attorney, Agent, or Firm* — Brian J. Colandreo; Michael T. Abramson; Holland & Knight LLP (57) ABSTRACT

A method, computer program product, and computer system for identifying, by a computing device, a plurality of sources. One or more feature values of a plurality of features may be assigned to a first source of the plurality of sources. One or more feature values of the plurality of features may be assigned to a second source of the plurality of sources. A first score for the first source and a second score for the second source may be determined based upon, at least in part, the one or more feature values assigned to the first source and the second source. One of the first source and the second source may be selected for spatial processing based upon, at least in part, the first score for the first source and the second score for the second source.

15 Claims, 5 Drawing Sheets

SYSTEM AND METHOD FOR FEATURE BASED BEAM STEERING

BACKGROUND

Automated speech recognition (ASR) may be used for many different things. For example, smart speakers and Internet of Things (IoT) devices may employ ASR. Generally, these devices may include one or more beamformers that may be steered towards a source with the largest activity in the current frame, which was presumed to be the source of interest. This did not typically allow the exclusion of some of the known sources from the set of desired sources. Practically, the beam may falsely treat the interference as desired.

BRIEF SUMMARY OF DISCLOSURE

In one example implementation, a method, performed by one or more computing devices, may include but is not limited to identifying, by a computing device, a plurality of sources. One or more feature values of a plurality of features may be assigned to a first source of the plurality of sources. One or more feature values of the plurality of features may be assigned to a second source of the plurality of sources. A first score for the first source and a second score for the second source may be determined based upon, at least in part, the one or more feature values assigned to the first source and the second source. One of the first source and the second source may be selected for spatial processing based upon, at least in part, the first score for the first source and the second score for the second source.

One or more of the following example features may be included. At least one feature of the plurality of features may include source persistency of activity. At least one feature of the plurality of features may include one of source starting and stopping activity. At least one feature of the plurality of features may include source mobility. At least one feature of the plurality of features may include one of source energy and source activity. Determining the first score for the first source and the second score for the second source may include assigning weights to the one or more feature values. Identifying the plurality of sources may include at least one of multisource localization and video.

In another example implementation, a computing system may include one or more processors and one or more memories configured to perform operations that may include but are not limited to identifying a plurality of sources. One or more feature values of a plurality of features may be assigned to a first source of the plurality of sources. One or more feature values of the plurality of features may be assigned to a second source of the plurality of sources. A first score for the first source and a second score for the second source may be determined based upon, at least in part, the one or more feature values assigned to the first source and the second source. One of the first source and the second source may be selected for spatial processing based upon, at least in part, the first score for the first source and the second score for the second source.

One or more of the following example features may be included. At least one feature of the plurality of features may include source persistency of activity. At least one feature of the plurality of features may include one of source starting and stopping activity. At least one feature of the plurality of features may include source mobility. At least one feature of the plurality of features may include one of source energy and source activity. Determining the first score for the first source and the second score for the second source may include assigning weights to the one or more feature values. Identifying the plurality of sources may include at least one of multisource localization and video.

In another example implementation, a computer program product may reside on a computer readable storage medium having a plurality of instructions stored thereon which, when executed across one or more processors, may cause at least a portion of the one or more processors to perform operations that may include but are not limited to identifying a plurality of sources. One or more features of a plurality of features may be assigned to a first source of the plurality of sources. One or more feature values of a plurality of features may be assigned to a first source of the plurality of sources. One or more feature values of the plurality of features may be assigned to a second source of the plurality of sources. A first score for the first source and a second score for the second source may be determined based upon, at least in part, the one or more feature values assigned to the first source and the second source. One of the first source and the second source may be selected for spatial processing based upon, at least in part, the first score for the first source and the second score for the second source.

One or more of the following example features may be included. At least one feature of the plurality of features may include source persistency of activity. At least one feature of the plurality of features may include one of source starting and stopping activity. At least one feature of the plurality of features may include source mobility. At least one feature of the plurality of features may include one of source energy and source activity. Determining the first score for the first source and the second score for the second source may include assigning weights to the one or more feature values. Identifying the plurality of sources may include at least one of multisource localization and video.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Figure 1:
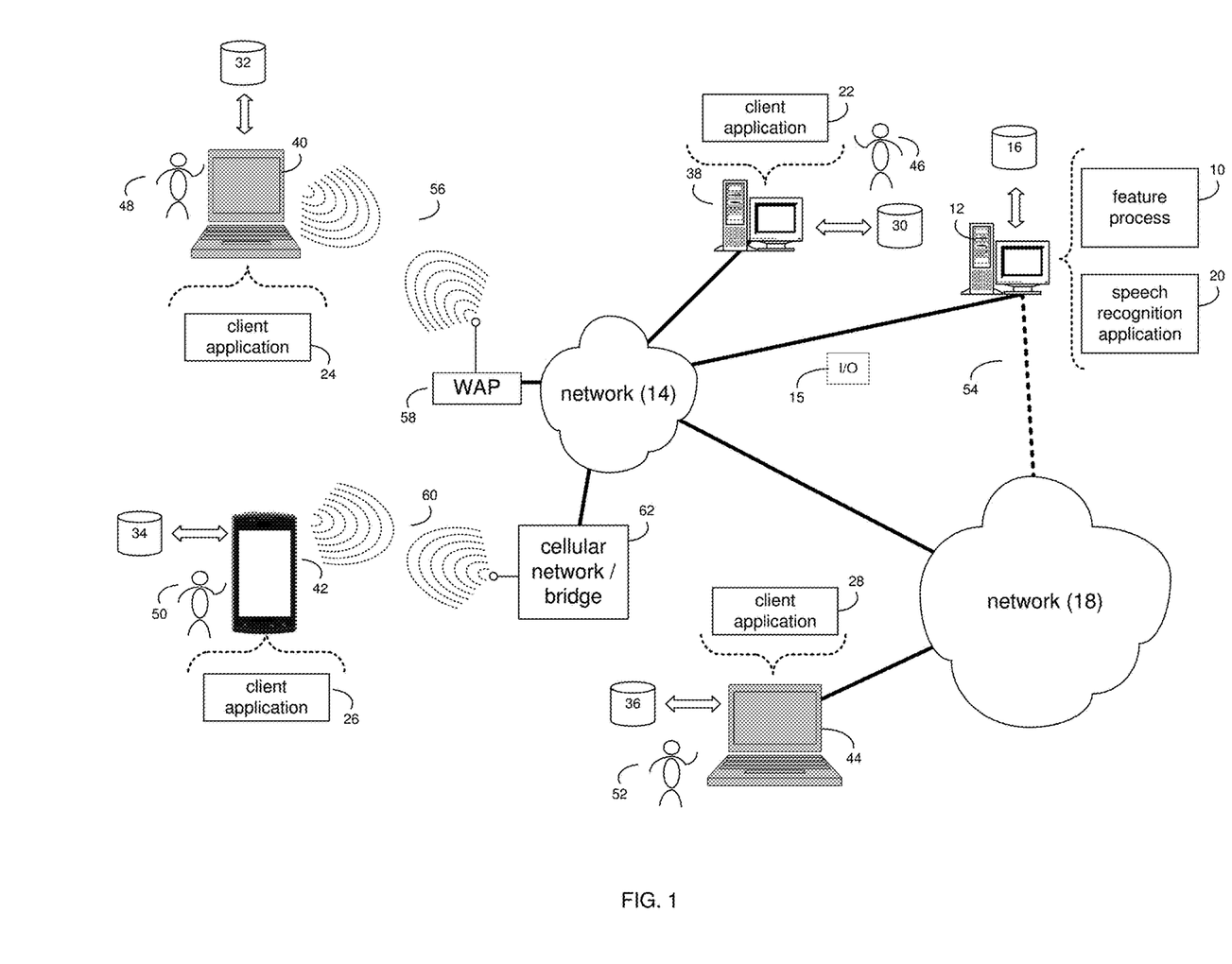
FIG. 1 is an example diagrammatic view of a feature process coupled to an example distributed computing network according to one or more example implementations of the disclosure.

Referring now to the example implementation of FIG. 1, there is shown feature process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a feature process, such as feature process 10 of FIG. 1, may identify, by a computing device, a plurality of sources. One or more feature values of a plurality of features may be assigned to a first source of the plurality of sources. One or more feature values of the plurality of features may be assigned to a second source of the plurality of sources. A first score for the first source and a second score for the second source may be determined based upon, at least in part, the one or more feature values assigned to the first source and the second source. One of the first source and the second source may be selected for spatial processing based upon, at least in part, the first score for the first source and the second score for the second source.

In some implementations, the instruction sets and subroutines of feature process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, feature process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute an automatic speech recognition (ASR) application (e.g., speech recognition application 20), examples of which may include, but are not limited to, e.g., an automatic speech recognition (ASR) application (e.g., modeling, etc.), a natural language understanding (NLU) application (e.g., machine learning, intent discovery, etc.), a text to speech (TTS) application (e.g., context awareness, learning, etc.), a speech signal enhancement (SSE) application (e.g., multi-zone processing/beamforming, noise suppression, etc.), a voice biometrics/wake-up-word processing application, a video conferencing application, a voice-over-IP application, a video-over-IP application, an Instant Messaging (IM)/ "chat" application, a short messaging service (SMS)/multimedia messaging service (MMS) application, or other application that allows for virtual meeting and/or remote collaboration and/or recognition/translation of spoken language into text by computing devices.

In some implementations, feature process 10 and/or speech recognition application 20 may be accessed via one or more of client applications 22, 24, 26, 28. In some implementations, feature process 10 may be a standalone application, or may be an applet/application/script/extension that may interact with and/or be executed within speech recognition application 20, a component of speech recognition application 20, and/or one or more of client applications 22, 24, 26, 28. In some implementations, speech recognition application 20 may be a standalone application, or may be an applet/application/script/extension that may interact with and/or be executed within feature process 10, a component of feature process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of feature process 10 and/or speech recognition application 20. Examples of client applications 22, 24, 26, 28 may include, but are not limited to, e.g., an automatic speech recognition (ASR) application (e.g., modeling, etc.), a natural language understanding (NLU) application (e.g., machine learning, intent discovery, etc.), a text to speech (TTS) application (e.g., context awareness, learning, etc.), a speech signal enhancement (SSE) application (e.g., multizone processing/beamforming, noise suppression, etc.), a voice biometrics/wake-up-word processing application, a video conferencing application, a voice-over-IP application, a video-over-IP application, an Instant Messaging (IM)/ "chat" application, a short messaging service (SMS)/multimedia messaging service (MMS) application, or other application that allows for virtual meeting and/or remote collaboration and/or recognition/translation of spoken language into text by computing devices, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of feature process 10 (and vice versa). Accordingly, in some implementations, feature process 10 may be a purely server-side application, a purely client-side application, or a hybrid server-side/client-side application that is cooperatively executed by one or more of client applications 22, 24, 26, 28 and/or feature process 10.

In some implementations, one or more of client applications 22, 24, 26, 28 may be configured to effectuate some or all of the functionality of speech recognition application 20 (and vice versa). Accordingly, in some implementations, speech recognition application 20 may be a purely server-side application, a purely client-side application, or a hybrid server-side/client-side application that is cooperatively executed by one or more of client applications 22, 24, 26, 28 and/or speech recognition application 20. As one or more of client applications 22, 24, 26, 28, feature process 10, and speech recognition application 20, taken singly or in any combination, may effectuate some or all of the same functionality, any description of effectuating such functionality via one or more of client applications 22, 24, 26, 28, feature process 10, speech recognition application 20, or combination thereof, and any described interaction(s) between one or more of client applications 22, 24, 26, 28, feature process 10, speech recognition application 20, or combination thereof to effectuate such functionality, should be taken as an example only and not to limit the scope of the disclosure.

In some implementations, one or more of users 46, 48, 50, 52 may access computer 12 and feature process 10 (e.g., using one or more of client electronic devices 38, 40, 42, 44) directly through network 14 or through secondary network 18. Further, computer 12 may be connected to network 14 through secondary network 18, as illustrated with phantom link line 54. Feature process 10 may include one or more user interfaces, such as browsers and textual or graphical user interfaces, through which users 46, 48, 50, 52 may access feature process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
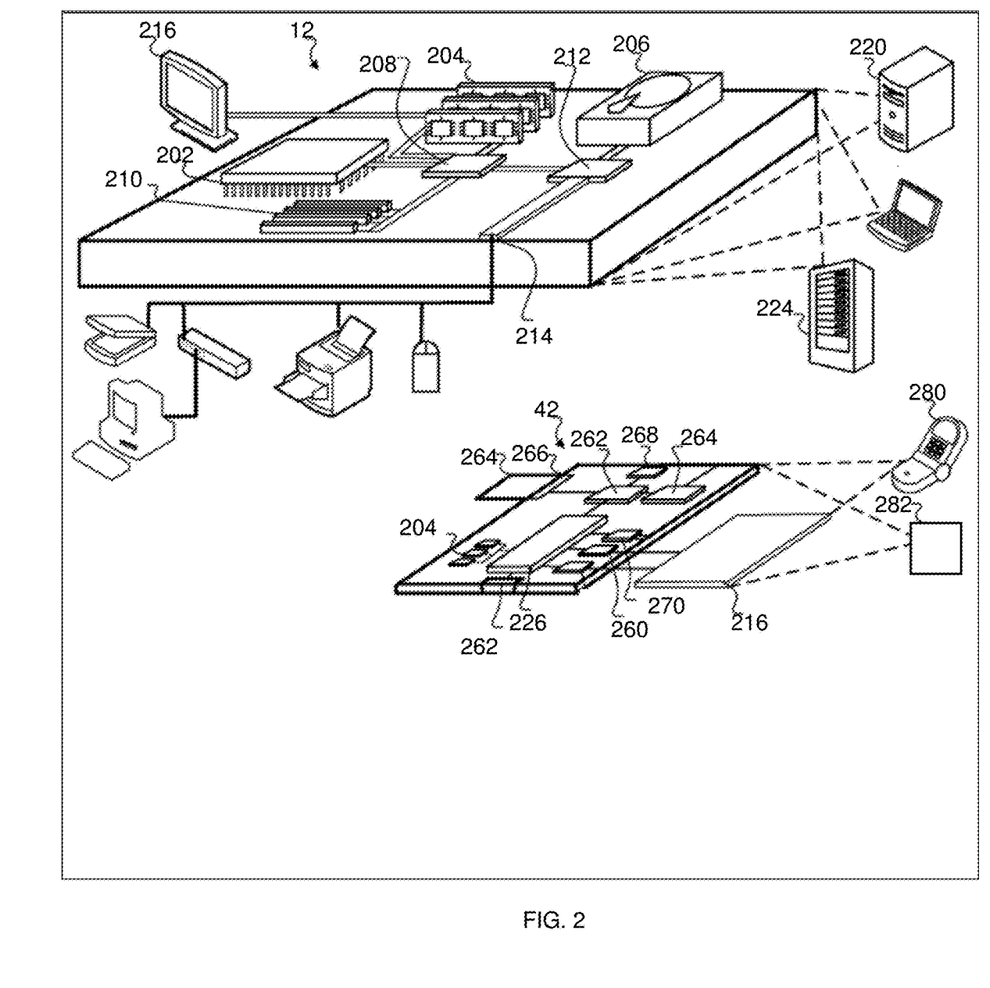
FIG. 2 is an example diagrammatic view of a computer and client electronic device of FIG. 1 according to one or more example implementations of the disclosure.

Referring also to the example implementation of FIG. 2, there is shown a diagrammatic view of computer 12 and client electronic device 42. While client electronic device 42 and computer 12 are shown in this figure, this is for example purposes only and is not intended to be a limitation of this disclosure, as other configurations are possible. Additionally, any computing device capable of executing, in whole or in part, feature process 10 may be substituted for client electronic device 42 and computer 12 (in whole or in part) within FIG. 2, examples of which may include but are not limited to one or more of client electronic devices 38, 40, and 44. Client electronic device 42 and/or computer 12 may also include other devices, such as televisions with one or more processors embedded therein or attached thereto as well as any of the microphones, microphone arrays, and/or speakers described herein. The components shown here, their connections and relationships, and their functions, are meant to be examples only, and are not meant to limit implementations of the disclosure described.

In some implementations, computer 12 may include processor 202, memory 204, storage device 206, a high-speed interface 208 connecting to memory 204 and high-speed expansion ports 210, and low speed interface 212 connecting to low speed bus 214 and storage device 206. Each of the components 202, 204, 206, 208, 210, and 212, may be interconnected using various busses, and may be mounted on a common motherboard or in other manners as appropriate. The processor 202 can process instructions for execution within the computer 12, including instructions stored in the memory 204 or on the storage device 206 to display graphical information for a GUI on an external input/output device, such as display 216 coupled to high speed interface 208. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

Memory 204 may store information within the computer 12. In one implementation, memory 204 may be a volatile memory unit or units. In another implementation, memory 204 may be a non-volatile memory unit or units. The memory 204 may also be another form of computer-readable medium, such as a magnetic or optical disk.

Storage device 206 may be capable of providing mass storage for computer 12. In one implementation, the storage device 206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 204, the storage device 206, memory on processor 202, or a propagated signal.

High speed controller 208 may manage bandwidth-intensive operations for computer 12, while the low speed controller 212 may manage lower bandwidth-intensive operations. Such allocation of functions is exemplary only. In one implementation, the high-speed controller 208 may be coupled to memory 204, display 216 (e.g., through a graphics processor or accelerator), and to high-speed expansion ports 210, which may accept various expansion cards (not shown). In the implementation, low-speed controller 212 is coupled to storage device 206 and low-speed expansion port 214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computer 12 may be implemented in a number of different forms, as shown in the figure. For example, computer 12 may be implemented as a standard server 220, or multiple times in a group of such servers. It may also be implemented as part of a rack server system 224. Alternatively, components from computer 12 may be combined with other components in a mobile device (not shown), such as client electronic device 42. Each of such devices may contain one or more of computer 12, client electronic device 42, and an entire system may be made up of multiple computing devices communicating with each other.

Client electronic device 42 may include processor 226, memory 204, an input/output device such as display 216, a communication interface 262, and a transceiver 264, among other components. Client electronic device 42 may also be provided with a storage device, such as a microdrive or other device, to provide additional storage. Each of the components 226, 204, 216, 262, and 264, may be interconnected using various buses, and several of the components may be mounted on a common motherboard or in other manners as appropriate.

Processor 226 may execute instructions within client electronic device 42, including instructions stored in the memory 204. The processor may be implemented as a chipset of chips that include separate and multiple analog and digital processors. The processor may provide, for example, for coordination of the other components of client electronic device 42, such as control of user interfaces, applications run by client electronic device 42, and wireless communication by client electronic device 42.

In some embodiments, processor 226 may communicate with a user through control interface 258 and display interface 260 coupled to a display 216. The display 216 may be, for example, a TFT LCD (Thin-Film-Transistor Liquid Crystal Display) or an OLED (Organic Light Emitting Diode) display, or other appropriate display technology. The display interface 260 may comprise appropriate circuitry for driving the display 216 to present graphical and other information to a user. The control interface 258 may receive commands from a user and convert them for submission to the processor 226. In addition, an external interface 262 may be provide in communication with processor 226, so as to enable near area communication of client electronic device 42 with other devices. External interface 262 may provide, for example, for wired communication in some implementations, or for wireless communication in other implementations, and multiple interfaces may also be used.

In some embodiments, memory 204 may store information within the Client electronic device 42. The memory 204 can be implemented as one or more of a computer-readable medium or media, a volatile memory unit or units, or a non-volatile memory unit or units. Expansion memory 264 may also be provided and connected to client electronic device 42 through expansion interface 266, which may include, for example, a SIMM (Single In Line Memory Module) card interface. Such expansion memory 264 may provide extra storage space for client electronic device 42, or may also store applications or other information for client electronic device 42. Specifically, expansion memory 264 may include instructions to carry out or supplement the processes described above, and may include secure information also. Thus, for example, expansion memory 264 may be provide as a security module for client electronic device 42, and may be programmed with instructions that permit secure use of client electronic device 42. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 204, expansion memory 264, memory on processor 226, or a propagated signal that may be received, for example, over transceiver 264 or external interface 262.

Client electronic device 42 may communicate wirelessly through communication interface 262, which may include digital signal processing circuitry where necessary. Communication interface 262 may provide for communications under various modes or protocols, such as GSM voice calls, SMS, EMS, or MMS speech recognition, CDMA, TDMA, PDC, WCDMA, CDMA2000, or GPRS, among others. Such communication may occur, for example, through radio-frequency transceiver 264. In addition, short-range communication may occur, such as using a Bluetooth, WiFi, or other such transceiver (not shown). In addition, GPS (Global Positioning System) receiver module 268 may provide additional navigation and location-related wireless data to client electronic device 42, which may be used as appropriate by applications running on client electronic device 42.

Client electronic device 42 may also communicate audibly using audio codec 270, which may receive spoken information from a user and convert it to usable digital information. Audio codec 270 may likewise generate audible sound for a user, such as through a speaker, e.g., in a handset of client electronic device 42. Such sound may include sound from voice telephone calls, may include recorded sound (e.g., voice messages, music files, etc.) and may also include sound generated by applications operating on client electronic device 42. Client electronic device 42 may be implemented in a number of different forms, as shown in the figure. For example, it may be implemented as a cellular telephone 280. It may also be implemented as part of a smartphone 282, personal digital assistant, remote control, or other similar mobile device.

As discussed above, automated speech recognition (ASR) may be used for many different things. For example, smart speakers and Internet of Things (IoT) devices may employ ASR. Generally, these devices may include multiple beamformers that may be steered towards a source with the largest activity in the current frame, which was presumed to be the source of interest. This did not typically allow the exclusion of some of the known sources from the set of desired sources. Practically, the beam may falsely treat the interference as desired. Typically, speech enhancement for IoT devices were tested by, e.g., mounting a loudspeaker with interference and one playing the desired signal. Using known techniques, systems were not able to truly distinguish both without using a second beam. However, while not requiring a single beamformer, feature process 10 may now obtain similar performance with using a single beamformer. Moreover, experiments have shown that the introduction of one or more of the features (e.g., the "persistency" feature) into the beam steering control may lead to a substantial performance improvement of SSE solutions for IoT devices. As will be discussed in greater detail below, the feature process 10 may better identify the properties of the sources, which may lead to improved beamsteering and better rejection of undesired signals.

As will be discussed below, feature process 10 may at least help, e.g., improve beam steering technology necessarily rooted in computer technology in order to overcome an example and non-limiting problem specifically arising in the realm of automated speech recognition associated with, e.g., Wake-up-word (WuW) source detection and identification. It will be appreciated that the computer processes described throughout are not considered to be well-understood, routine, and conventional functions.

Figure 3:
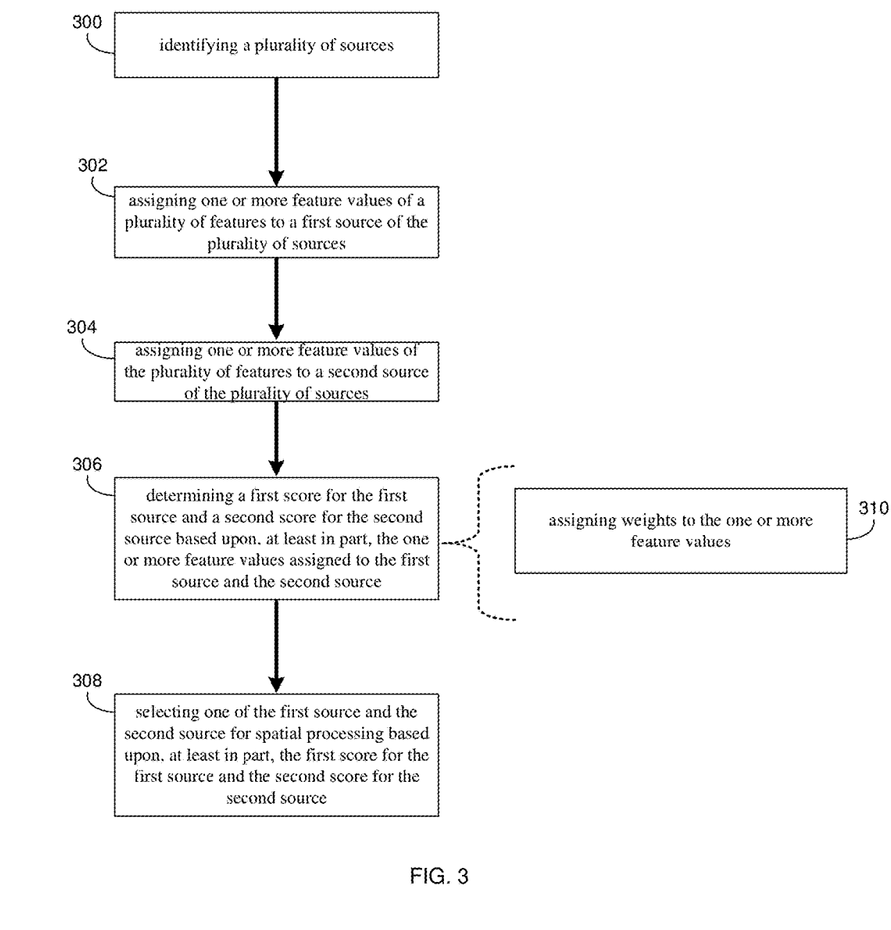
FIG. 3 is an example flowchart of a feature process according to one or more example implementations of the disclosure.
Figure 4:
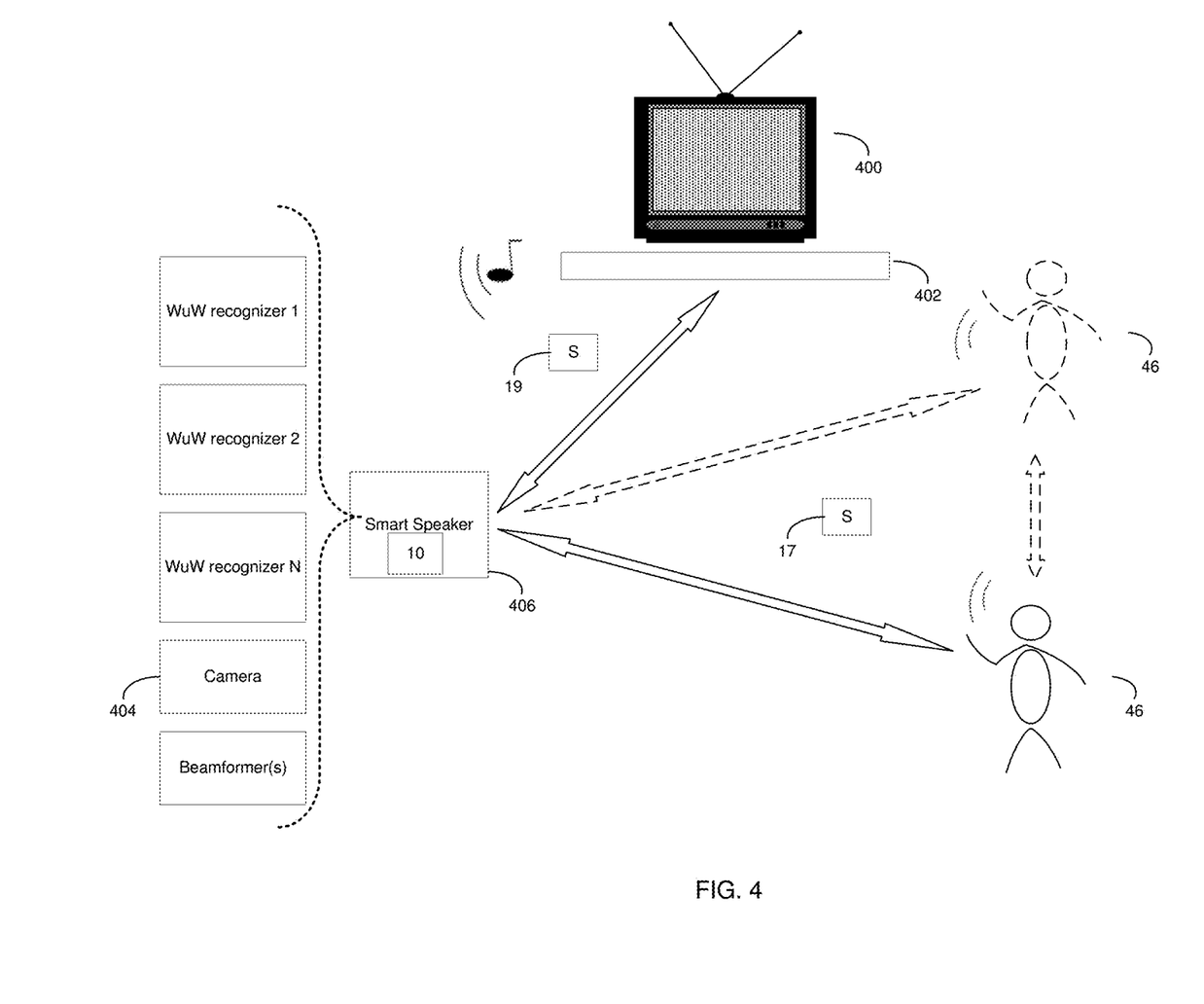
FIG. 4 is an example diagrammatic view of an example environment that may be used by feature process according to one or more example implementations of the disclosure.

The Feature Process:

As discussed above and referring also at least to the example implementations of FIGS. 3-4, feature process 10 may identify 300, by a computing device, a plurality of sources. Feature process 10 may assign 302 one or more feature values of a plurality of features to a first source of the plurality of sources. Feature process 10 may assign 304 one or more feature values of the plurality of features to a second source of the plurality of sources. Feature process 10 may determine 306 a first score for the first source and a second score for the second source based upon, at least in part, the one or more feature values assigned to the first source and the second source. Feature process 10 may select 308 one of the first source and the second source for spatial processing based upon, at least in part, the first score for the first source and the second score for the second source.

The term "beamforming", as used herein, may generally refer to a signal processing technique used in sensor arrays for directional signal transmission and/or reception. Beamforming methods may be used for background noise reduction in a variety of different applications. A beamformer, may be configured to process signals emanating from, e.g., a microphone array, to obtain a combined signal in such a way that signal components coming from a direction different from a predetermined wanted signal direction are suppressed. Microphone arrays, unlike conventional directional microphones, may be electronically steerable which gives them the ability to acquire a high-quality signal or signals from a desired direction or directions while attenuating off-axis noise or interference. It should be noted that the discussion of beamforming is provided merely by way of example as the teachings of the present disclosure may be used with any suitable signal processing method.

As will be discussed in greater detail below, feature process 10 may assign one or more feature values to any of the known sources and may combine the feature values to obtain a so-called speech-score. This score may indicate the likelihood of desired speech for each source, where the source with the largest speech score may be chosen for the beam steering. For example, in some implementations, feature process 10 may identify 300, by a computing device, a plurality of sources, and in some implementations, identifying 300 the plurality of sources may include at least one of multisource localization and video. For example, in some implementations, and referring at least to the example implementation of FIG. 4, feature process 10 (e.g., via smart speaker 406) may receive a first signal (e.g., signal 17) emitted from one or more sources (e.g., audio/acoustic source, such as user 46), and feature process 10 may receive a second signal (e.g., signal 19) emitted from the one or more sources (e.g., audio/acoustic source, such as TV speaker 402). It will be appreciated that the one or more sources associated with the first signal and the one or more sources associated with the second signal may be the same sources, different sources, or combinations thereof (e.g., first source+second source=first signal, or second source+third source=second signal, etc.). The sources may emit their respective signals that may be recorded by one or more microphones. The microphone signals may be processed, for example, with acoustic sources being spatially localized and tracked, and with the respective output signals being generated such that the different sources may be separated in the signals. On the one hand, the first signal may contain portions of another source (e.g., second, third, etc.). On the other hand, a first source may also be contained in the second signal. Thus, as will be discussed more below, if a wake-up-word (WuW) is detected in either signal, feature process 10 may have the goal to determine which source was actually responsible for the wake-up-word. In some implementations, feature process 10 may focus on two (or more) selected sources to extract their respective received signals. For instance, each of the two respective output signals may be used for Wake-up-Word (WuW) spotting and the relative confidence of the two WuW recognizers may be determined to decide which of the two (or more) present sound sources cannot participate in a dialogue phase. As an example, feature process 10 may be based on a multisource localization algorithm. This may provide information about the number of sources, their location, as well as activity information (e.g., a sound source may currently be silent or not). Based on this information, at least one beamformer may be controlled by feature process 10 in the sense that its steering angle may be determined. During the WuW spotting phase, the beams may jump towards every sound source that is detected as a new source. Generally, the beam that is closest to that source may take it. This essentially makes feature process 10 listen into all possible directions. However, feature process 10 may also monitor whether a source is moving or not, and/or how active the source is. Once a source is found that has been active for some time (e.g., a threshold time of 1 second) and is additionally not moving, one beam may be set aside for that source, which may from then on continue to capture that source (i.e., a source of interest). The source may be, e.g., a TV (e.g., TV 400) or TV speaker (e.g., wireless TV speaker 402), but may also be a speaking person (e.g., user 46) that may possibly utter the WuW. In both cases, SP 10 may initially consider each source as a source of interest.

Figure 5:
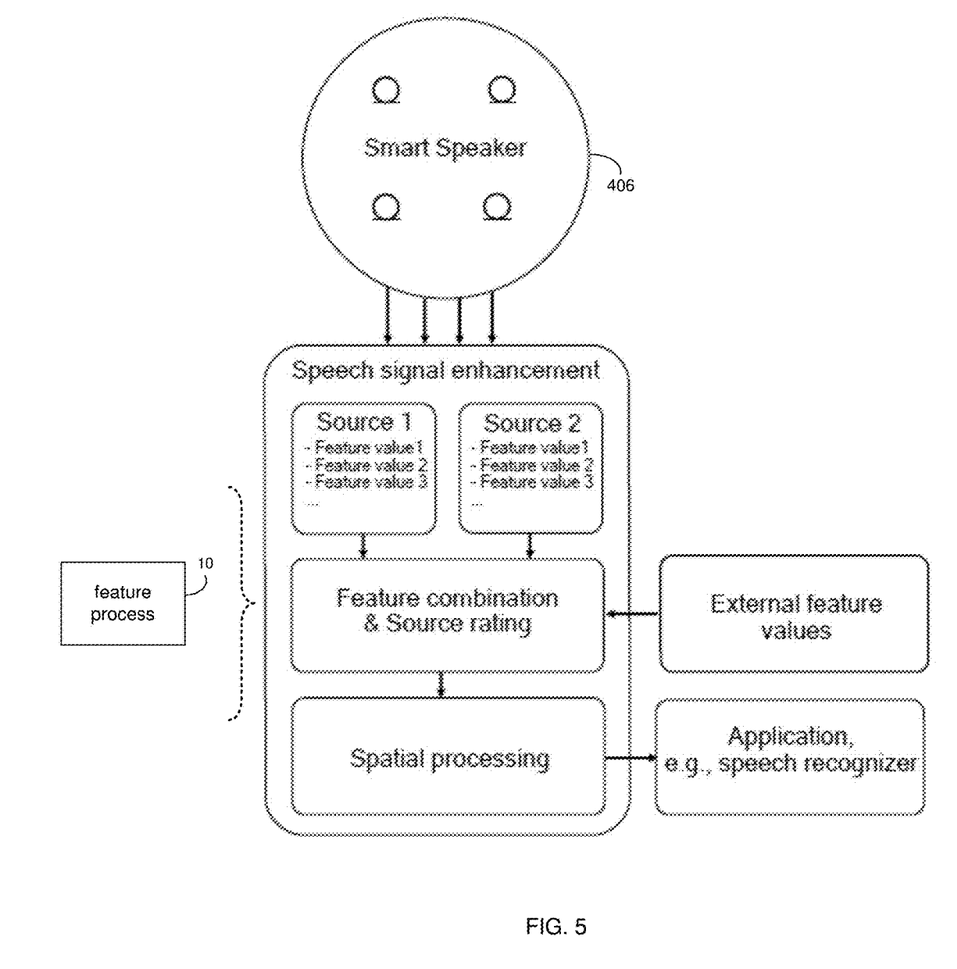
FIG. 5 is an example diagrammatic view of an example smart speaker that may be used by feature process according to one or more example implementations of the disclosure.

In some implementations, SP 10 (e.g., via smart speaker 406 shown in FIG. 4 and in more detail in FIG. 5) may use external prior information (e.g., from a camera) to detect the WuW source. Even if there is only one beamformer, a camera may provide information about the location the desired WuW source (for instance because of face recognition). Thus, SP 10 may combine external information from the camera with the information available from the SSE.

In some implementations, movement of the first source may be tracked with at least one of one or more core localizers (e.g., beamformer(s) and/or a camera). For instance, while one or more implementations may use one or more beamformers (e.g., within smart speaker 406) to track movement of the first source (e.g., user 46), it will be appreciated that a camera (e.g., camera 404) may also be used by feature process 10 to track movement of one or more sources. For instance, core localizers of sources (via feature process 10) may also not only use acoustic methods (like "steered response power," "generalized cross correlation" (GCC) or "multi-signal classification" (MUSIC)), but other methods like visual information gained via cameras may be exploited to localize sources (singly or in combination).

Thus, feature process 10 may use multisource localization to control the beamformer(s) in order to separate two or more sound sources (provided in two or more output signals), and may use multisource localization to detect active sources that do not move. This means that feature process 10 may consider active sources that are not moving as a source of interest. Feature process 10 may also thus control at least one of the beamformers such as to capture this "active static" source, and control another beamformer to capture any other source. As a result, feature process 10 may provide a multisource ASL based processing that provides a focus on one source deemed important (such as the TV) while any other possible source may be captured by another beam. This leads to a spatially open behavior, where the second beam does not focus on the source captured by the first but may on anything else. Thus, in the example, controlling two beams such that one excludes signals captured by the other beam may not only the steering angle may be controlled, but also the signal components that are minimized by the beamforming. This means optimizing the separation performance, e.g., the first beam lets source A pass without distortion and cancels source B, where the second beam does the exact opposite, e.g., lets source B pass without distortion but cancels source A, which may be achieved, for example, using the "Linearly Constrained Minimum Variance Design" for the beams.

While only two sources are described in the examples, it will be appreciated that more than two sources may also be used with the present disclosure. As such, the use of only two sources should be taken as example only and not to limit the scope of the disclosure.

In some implementations, feature process 10 may assign 302 one or more feature values of a plurality of features to a first source of the plurality of sources, and feature process 10 may assign 304 one or more feature values of the plurality of features to a second source of the plurality of sources. For example, in some implementations, at least one feature of the plurality of features may include source persistency of activity. For example, TV speaker (e.g., the second source) may constantly be emitting sound through TV speaker 402 while TV 400 is on (e.g., while watching a TV show or movie, etc.). As such, feature process 10 may assign TV speaker 402 the feature value associated with persistent source activity. Conversely, user 46 (e.g., the first source) generally is not constantly emitting sound when speaking, and thus may not be assigned the feature value associated with persistent source activity. That is, persistently active sources are considered unlikely to be desired sources, may be considered as interference, and may be cancelled/suppressed by the beamformer (via feature process 10).

In some implementations, the persistency feature value may represent continuous activity of a source. As such, feature process 10 may monitor the activity over time and start to increase the persistency feature value when there is observed activity in some consecutive frames (e.g., for 1 second). Feature process 10 may continue increasing the feature value as long as there is observed activity and the persistency is below its maximum (e.g., 100%). Afterwards, feature process 10 may hold the value until the activity stops, as will be discussed below.

In some implementations, the persistency feature may add robustness against masking sources, as feature process 10 may take into account the situation where there is no observed activity from a (first) source due to a masking (second) source. For example, feature process 10 may want to determine the persistency of a radio (e.g., first source) that may continuously play music. Assume for example purposes only that the radio's persistency has already reached its maximum and now a user (e.g., second source) utters the WuW. As will be discussed below (e.g., in context of an energy feature), assuming the user intends to set apart from the interfering noise, the WuW may be louder compared to the music. Thus, feature process 10 may observe activity of the WuW speaker, but does not know whether the radio is still playing (e.g., since the persistent source is masked by the speaker). However, feature process 10 may be able to detect this situation, as feature process 10 tracked the radio's (first) energy level, it may be known that there is currently an active source whose (second) energy level exceeds the radio's energy level. In this example, feature process 10 may hold the persistency value (even though feature process 10 may not actually observe activity) for the radio.

In some implementations, feature process 10 may consider the scenario that the activity stops (also discussed below). Thus, feature process 10 may not observe activity from the radio and does not detect a masking source. Even in this example scenario, short dropouts may have to be bridged as they may correspond to short pauses within the music. As such, feature process 10 may hold the persistency value also in scenario that there is no observed activity, but may start decreasing the persistency value when activity remains absent for some consecutive frames (e.g., 0.2 seconds). Then, feature process 10 may decrease the persistency value until it reaches its minimum (e.g., 0%).

In some implementations, at least one feature of the plurality of features may include one of source starting and stopping activity. For example, the TV speaker (e.g., the second source) may generally constantly be active (as discussed above), and thus may not be assigned the feature of source starting and stopping (e.g., transient/onset) of activity. That is, sources that do not suddenly become active or non-active may be considered as interference and unlikely to be desired sources and may be cancelled/suppressed by the beamformer (via feature process 10). Conversely, user 46 (e.g., the first source) generally may suddenly become active (e.g., having not been previously observed before until uttering the WuW, and then no longer uttering anything shortly thereafter), and thus may be assigned the feature value associated with source starting and stopping activity. As such, feature process 10 may assign user 46 the feature value associated with source starting and stopping activity.

In some implementations, at least one feature of the plurality of features may include source mobility. For example, the TV speaker (e.g., the second source) may generally be in a static location (i.e., not moving), and thus may not be assigned the feature value associated with source mobility. That is, sources that do not move are considered unlikely to be desired sources and may be cancelled/suppressed by the beamformer (via feature process 10). Conversely, user 46 (e.g., the first source) generally may move around, and thus may be assigned the feature value associated with source mobility. As such, feature process 10 may assign user 46 the feature value associated with source mobility.

In some implementations, feature process 10 may explicitly steer a "null" into the direction of an interference. For example, feature process 10 may not specify the desired direction of the interfering source, but may define which source is definitely not the WuW source and hence may be cancelled/suppressed. In the example, the beamsteering may be considered as a general control mechanism for spatial signal processing.

In some implementations, at least one feature of the plurality of features may include one of source energy and source activity. For example, a desired speaker (e.g., user 46) may intend to set himself/herself apart from the background noise (e.g., TV speaker 402). Raising one's voice (represented by a high source energy) may thus be taken as an indicator for desired speech (e.g., from WuW source). In some implementations, focusing on the loudest source in the area may be a reasonable strategy to capture the desired speaker. In some implementations, any of the features that are employed to calculate the speech score do not have to be independent. For example, the energy of a first source may be normalized with regard to the energy of a second source. That is, feature process 10 may consider energy ratios instead of the absolute value(s).

In some implementations, feature process 10 may determine 306 a first score for the first source and a second score for the second source based upon, at least in part, the one or more feature values assigned to the first source and the second source. For example, in some implementations, determining 306 the first score for the first source and the second score for the second source may include assigning 310 weights to the one or more feature values. For instance, and continuing with the above example, assume for example purposes only for simplicity that the TV speaker is only assigned the feature value of persistent source activity, and further assume that user 46 is only assigned the feature value of source mobility. In the example, further assume that the weight assigned to the mobility feature value is higher than the feature assigned to the persistent source activity feature value. As such, in the example, the score determined for the first source will be higher than the score determined for the second source. It will be appreciated that while only one feature is each assigned to the first and second source, multiple features with their respective assigned weights may be assigned to each of the sources to determine the scores for each source. Moreover, it will be appreciated that various other feature values for other features may be assigned and weighted. As such, the use of only one feature (as well as the use of these example features) should be taken as example only and not to otherwise limit the scope of the disclosure.

In some implementations, the weights may control the influence of each feature. For instance, with each weight, feature process 10 may control to what extent a high feature value is rewarded in the speech score or (for other features) to what extent a low feature value is penalized. It will be appreciated that other combinations of features (e.g., the value of persistency may be combined with the value of energy to obtain a final speech score value), where the combination may be implemented in different ways, e.g., based on Neural Networks or other machine learning techniques are possible as well. In some implementations, the weights may be chosen dynamically by feature process 10, depending on the current situation.

In some implementations, feature process 10 may select 308 one of the first source and the second source for spatial processing based upon, at least in part, the first score for the first source and the second score for the second source. For instance, and continuing with the above example where the score determined for the first source will be higher than the score determined for the second source, feature process 10 may select 308 the first source for beam steering based upon, at least in part, the score for the first source being higher than the score for the second source. In some implementations, the most important features may be "source persistency," "turned active" (e.g., source starting and stopping activity), and "mobility." For instance, a source that persistently shows activity with few pauses is not very likely to be the WuW source and may therefore be given a lower weight during the feature combination (e.g., many small pauses may be typical for speech). On the other hand, a source that just turns active (e.g., produces sound) is likely to be a WuW source. Such sources may therefore be assigned a higher weight. Moreover, feature process 10 may help improve the robustness of WuW detection to assign lower weights to sources that do not move (i.e., low mobility). As such, sources with sounds exhibiting a combination of one or more features indicating a non-WuW source may be suppressed, while a combination of one or more features indicating a WuW source may be maintained and selected for beam steering. It will be appreciated that spatial processing may include beamforming, as well as using one or more speaker-dedicated microphones. For instance, in an example and non-limiting automotive environment, instead of a beamformer, speaker-dedicated microphones may be used for spatial processing. As such, the use of beamforming should be taken as example only and not to otherwise limit the scope of the disclosure.

It will be appreciated that while a higher score is considered to be the source selected for beam steering, a lower score may also be used without departing from the scope of the disclosure. For example, this may occur when the weight assigned to the mobility feature is lower than the feature assigned to the persistent source activity. As such, in the example, the score determined for the first source will be lower than the score determined for the second source. As such, the use of a higher score being considered the source selected for beam steering should be taken as example only and not to otherwise limit the scope of the disclosure.

As such, in the example and non-limiting context of acoustic speech enhancement for, e.g., smart speakers and IoT devices, the steering directions of one or more beamformers may be controlled by feature process 10 based upon, source identification in combination with assigned feature values to acoustics objects (i.e., the sources) that may allow a distinction of speech-like sources and interferers. In some implementations, the feature combination may yield a more robust beam steering, and in particular, may allow the interference source (e.g., a persistent source) to be suppressed, which may improve the WuW detection rates significantly. While the present disclosure is described with use of the WuW detection, it will be appreciated that the present disclosure may be used with various other ASR uses. As such, the use of WuW detection should be taken as example only and not to otherwise limit the scope of the present disclosure.

It will be appreciated that, in some implementations, feature process 10 may take into account "external" features that may be calculated outside SSE. For example, a voice biometry system associated with feature process 10 may inform the SSE portion of feature process 10 that a certain person is currently speaking. As feature process 10 may know in SSE which source is currently active, feature process 10 may align this information and assign the feature value gained by (external) voice biometry to a certain (internal) source. As such, the term "features" may include both the features discussed throughout, as well as the above-noted external features.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
  identifying, by a computing device, a plurality of sources;
  assigning one or more feature values of a plurality of features to a first source of the plurality of sources, wherein each of the one or more feature values assigned to the first source is assigned from a predetermined set of values that each respectively indicate at least one feature type of the plurality of features exhibited by the first source, wherein the at least one feature type of the plurality of features exhibited by the first source and assigned one of the one or more values includes source energy of the first source when compared to any other source of the plurality of sources;
  assigning one or more feature values of the plurality of features to a second source of the plurality of sources, wherein each of the one or more feature values assigned to the second source is assigned from the predetermined set of values that each respectively indicate at least one feature type of the plurality of features exhibited by the second source, wherein the at least one feature type of the plurality of features exhibited by the second source and assigned one of the one or more values includes source energy of the second source when compared to any other source of the plurality of sources;

determining a first score for the first source and a second score for the second source based upon, at least in part, the one or more feature values assigned to the first source and the second source from the predetermined set of values, wherein determining the first score for the first source and the second score for the second source includes assigning weights to the one or more feature values, wherein the weights assigned to the one or more feature values are dynamically assigned based upon the plurality of features assigned; and selecting one of the first source and the second source for spatial processing based upon, at least in part, the first score for the first source and the second score for the second source.

2. The computer-implemented method of claim 1 wherein the at least one feature type of the plurality of features further includes one of source starting and stopping activity.

3. The computer-implemented method of claim 1 wherein the at least one feature type of the plurality of features further includes source mobility.

4. The computer-implemented method of claim 1 wherein the at least one feature type of the plurality of features further includes one of source persistency of activity and source activity.

5. The computer-implemented method of claim 1 wherein identifying the plurality of sources includes at least one of multisource localization and video.

6. A computer program product residing on a non-transitory computer readable storage medium having a plurality of instructions stored thereon which, when executed across one or more processors, causes at least a portion of the one or more processors to perform operations comprising:

identifying a plurality of sources;

assigning one or more feature values of a plurality of features to a first source of the plurality of sources, wherein each of the one or more feature values assigned to the first source is assigned from a predetermined set of values that each respectively indicate at least one feature type of the plurality of features exhibited by the first source, wherein the at least one feature type of the plurality of features exhibited by the first source and assigned one of the one or more values includes source energy of the first source when compared to any other source of the plurality of sources;

assigning one or more feature values of the plurality of features to a second source of the plurality of sources, wherein each of the one or more feature values assigned to the second source is assigned from the predetermined set of values that each respectively indicate at least one feature type of the plurality of features exhibited by the second source, wherein the at least one feature type of the plurality of features exhibited by the second source and assigned one of the one or more values includes source energy of the second source when compared to any other source of the plurality of sources;

determining a first score for the first source and a second score for the second source based upon, at least in part, the one or more feature values assigned to the first source and the second source from the predetermined set of values, wherein determining the first score for the first source and the second score for the second source includes assigning weights to the one or more feature values, wherein the weights assigned to the one or more feature values are dynamically assigned based upon the plurality of features assigned; and selecting one of the first source and the second source for spatial processing based upon, at least in part, the first score for the first source and the second score for the second source.

7. The computer program product of claim 6 wherein the at least one feature type of the plurality of features further includes one of source starting and stopping activity.

8. The computer program product of claim 6 wherein the at least one feature type of the plurality of features further includes source mobility.

9. The computer program product of claim 6 wherein the at least one feature type of the plurality of features further includes one of source persistency of activity and source activity.

10. The computer program product of claim 6 wherein identifying the plurality of sources includes at least one of multisource localization and video.

11. A computing system including one or more processors and one or more memories configured to perform operations comprising:

identifying a plurality of sources;

assigning one or more feature values of a plurality of features to a first source of the plurality of sources, wherein each of the one or more feature values assigned to the first source is assigned from a predetermined set of values that each respectively indicate at least one feature type of the plurality of features exhibited by the first source, wherein the at least one feature type of the plurality of features exhibited by the first source and assigned one of the one or more values includes source energy of the first source when compared to any other source of the plurality of sources;

assigning one or more feature values of the plurality of features to a second source of the plurality of sources, wherein each of the one or more feature values assigned to the second source is assigned from the predetermined set of values that each respectively indicate at least one feature type of the plurality of features exhibited by the second source, wherein the at least one feature type of the plurality of features exhibited by the second source and assigned one of the one or more values includes source energy of the second source when compared to any other source of the plurality of sources;

determining a first score for the first source and a second score for the second source based upon, at least in part, the one or more feature values assigned to the first source and the second source from the predetermined set of values, wherein determining the first score for the first source and the second score for the second source includes assigning weights to the one or more feature values, wherein the weights assigned to the one or more feature values are dynamically assigned based upon the plurality of features assigned; and selecting one of the first source and the second source for spatial processing based upon, at least in part, the first score for the first source and the second score for the second source.

12. The computing system of claim 11 wherein the at least one feature type of the plurality of features further includes one of source starting and stopping activity.

13. The computing system of claim 11 wherein the at least one feature type of the plurality of features further includes source mobility.

14. The computing system of claim 11 wherein the at least one feature type of the plurality of features further includes one of source persistency of activity and source activity.

15. The computing system of claim 11 wherein identifying the plurality of sources includes at least one of multi-source localization and video.

\* \* \* \* \*